US008478822B2

(12) United States Patent
Lee et al.

(10) Patent No.: US 8,478,822 B2
(45) Date of Patent: Jul. 2, 2013

(54) DEVICE AND METHOD OF SHARING CONTENTS BASED ON TIME SYNCHRONIZATION

(75) Inventors: Gene Moo Lee, Seongnam-si (KR); Jin Wook Lee, Yongin-si (KR); Hun Lim, Yongin-si (KR); Won Keun Kong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 872 days.

(21) Appl. No.: 12/035,452

(22) Filed: Feb. 22, 2008

(65) Prior Publication Data
US 2009/0100135 A1  Apr. 16, 2009

(30) Foreign Application Priority Data

Oct. 15, 2007  (KR) .................. 10-2007-0103609

(51) Int. Cl.
*G06F 15/16* (2006.01)

(52) U.S. Cl.
USPC .......................................... 709/205

(58) Field of Classification Search
USPC ............... 709/201, 217, 226, 232, 248, 200,
709/203, 205; 705/51, 10; 370/390; 455/3.06,
455/418, 414.3, 500; 345/173; 725/62, 86,
725/135; 707/3, 10, 999.201
See application file for complete search history.

(56) References Cited

U.S. PATENT DOCUMENTS

| 5,847,972 | A | 12/1998 | Eick et al. |
| 7,627,808 | B2 * | 12/2009 | Blank et al. .................. 715/200 |
| 7,657,574 | B2 * | 2/2010 | Gupta et al. ........... 707/999.201 |
| 8,190,683 | B2 * | 5/2012 | Sloo et al. ..................... 709/205 |
| 8,316,081 | B2 * | 11/2012 | Svendsen ...................... 709/203 |
| 2003/0157948 | A1 * | 8/2003 | Nylund .......................... 455/500 |
| 2004/0215708 | A1 * | 10/2004 | Higashi et al. ................ 709/201 |
| 2005/0171913 | A1 * | 8/2005 | Kurihara et al. ................ 705/51 |
| 2006/0002681 | A1 * | 1/2006 | Spilo et al. ....................... 386/46 |
| 2006/0003753 | A1 * | 1/2006 | Baxter ....................... 455/414.3 |
| 2006/0156375 | A1 * | 7/2006 | Konetski ....................... 725/135 |
| 2006/0212508 | A1 * | 9/2006 | Deguchi ....................... 709/200 |
| 2006/0270395 | A1 * | 11/2006 | Dhawan et al. ................ 455/418 |
| 2007/0094691 | A1 * | 4/2007 | Gazdzinski ..................... 725/62 |
| 2007/0143493 | A1 * | 6/2007 | Mullig et al. ................. 709/232 |
| 2007/0168516 | A1 * | 7/2007 | Liu et al. ....................... 709/226 |
| 2007/0174246 | A1 * | 7/2007 | Sigurdsson et al. .............. 707/3 |
| 2007/0229465 | A1 * | 10/2007 | Sakai et al. .................... 345/173 |
| 2007/0232225 | A1 * | 10/2007 | Kikuchi ....................... 455/3.06 |
| 2007/0250761 | A1 * | 10/2007 | Bradley et al. ............. 715/500.1 |
| 2007/0271187 | A1 * | 11/2007 | Kurihara et al. ................ 705/51 |

(Continued)

FOREIGN PATENT DOCUMENTS

| JP | 2001-022613 A | 1/2001 |
| JP | 2003-157282 A | 5/2003 |

(Continued)

*Primary Examiner* — Imad Hussain
(74) *Attorney, Agent, or Firm* — NSIP Law

(57) ABSTRACT

A device and method of sharing contents based on time synchronization are provided. A first device may generate a time stamp with respect to contents being replayed by a second device and transmit the time stamp to the second device. In response, the second device may generate a contents list based on the time stamp and transmit the contents list to the first device. The first device may request contents selected by a user from among the contents list, and the second device may provide the requested contents to the first device.

15 Claims, 5 Drawing Sheets

U.S. PATENT DOCUMENTS

| | | | |
|---|---|---|---|
| 2007/0282848 A1* | 12/2007 | Kiilerich et al. | 707/10 |
| 2008/0005769 A1* | 1/2008 | Sunakawa | 725/86 |
| 2008/0077701 A1* | 3/2008 | Kongalath et al. | 709/232 |
| 2008/0114480 A1* | 5/2008 | Harb | 700/94 |
| 2008/0122796 A1* | 5/2008 | Jobs et al. | 345/173 |
| 2008/0151888 A1* | 6/2008 | Ahmed | 370/390 |
| 2008/0162668 A1* | 7/2008 | Miller | 709/219 |
| 2008/0172445 A1* | 7/2008 | Zaidelson et al. | 709/201 |
| 2008/0189168 A1* | 8/2008 | Kaplan et al. | 705/10 |
| 2008/0228852 A1* | 9/2008 | Husa et al. | 709/201 |
| 2009/0016522 A1* | 1/2009 | Torres et al. | 379/265.06 |
| 2009/0055510 A1* | 2/2009 | Svendsen | 709/217 |
| 2009/0063627 A1* | 3/2009 | Nowacek | 709/203 |
| 2009/0083444 A1* | 3/2009 | Faist | 709/248 |
| 2009/0233705 A1* | 9/2009 | LeMay et al. | 463/25 |
| 2010/0036910 A1* | 2/2010 | Nakazawa et al. | 709/203 |

FOREIGN PATENT DOCUMENTS

| | | |
|---|---|---|
| JP | 2003-173352 A | 6/2003 |
| KR | 10-2006-0072770 A | 6/2006 |
| KR | 10-2007-0035251 A | 3/2007 |

\* cited by examiner

| CONTENTS FILE NAME | CONTENTS LOG |
|---|---|
| 1.ppt | • c:\my patents\1.ppt<br>• Microsoft Power Point ®<br>• Permission : rw-/---/---(400)<br>• Time<br>   -Opened at F/closed at I<br>   -Active Duration : F~G/H~I |
| 1.avi | • c:\my movies\1.avi<br>• GOM player<br>• Permission : r--/r--/---(440)<br>• Time<br>   -Opened at F/closed at G<br>   -Active Duration : F~G |
| 3.mp3 | • c:\my music\3.mp3<br>• Apple iTunes ®<br>• Permission : rwx/r--/r--(644)<br>• Time<br>   -Opened at E/closed at H<br>   -Active Duration : E~F |

DEVICE AND METHOD OF SHARING CONTENTS BASED ON TIME SYNCHRONIZATION

CROSS-REFERENCE TO RELATED APPLICATION

This application claims the benefit under 35 U.S.C. §119(a) of a Korean Patent Application No. 10-2007-0103609, filed on Oct. 15, 2007, in the Korean Intellectual Property Office, the entire disclosure of which is incorporated herein by reference.

TECHNICAL FIELD

The following description relates to a device and method of sharing contents among devices.

BACKGROUND

Currently, many people enjoy a variety of contents using small portable terminals anytime and anywhere due to the development of digital technologies. Various peripheral devices for personal computing such as a personal computer (PC), keyboard, mouse, printer, and the like, are being used, and new devices will undoubtedly be developed.

In such a computing environment, the use of multimedia contents increases. A number of people enjoy video and music in the computing environment as well as mobile environment. Particularly, a desire to share contents with other people via mobile devices increases, in addition to individually enjoying multimedia contents. Accordingly, a variety of user created contents (UCC) websites are made, and sharing contents using a peer to peer (P2P) program becomes common.

Although the desire to share contents using digital devices gradually increases, in a current contents sharing method, users may share contents only when users previously know information about contents to be shared, for example, network addresses among devices, contents file information, file directory information, and the like.

Accordingly, there is a need for a technology which may enable a user to conveniently and instantly acquire various types of multimedia contents and information associated with the contents anytime and anywhere in a mobile environment.

SUMMARY

In one general aspect, there is provided a device and method of sharing contents among devices in which, where a user of a first device desires to acquire contents being replayed by a second device, the first device and the second device performs a time synchronization. Where the first devices receives a time stamp from the user, the second device may transmit a contents list corresponding to the time stamp to the first device, and enable the user to select contents. Accordingly, the user may acquire the desirable contents from the second device by only inputting the time stamp to the first device.

In another general aspect, a method of sharing contents among devices includes: a first device and a second device performing a time synchronization; the first device receiving, from a user, a time stamp with respect to contents being replayed by the second device; the first device transmitting the time stamp to the second device; the second device transmitting a contents list corresponding to the time stamp to the first device; the first device requesting the second device for contents selected by the user from among the contents list; and the second device providing the requested contents to the first device.

In still another general aspect, a device includes: a time synchronization unit which performs a time synchronization with at least one other device different from the device; a contents information generation unit which generates a contents log and a contents history with respect to at least one content being replayed after a time synchronization, when performing the time synchronization with a third device; a contents retrieval unit which retrieves at least one content corresponding to a time stamp by referring to the contents history, and generates a contents list including a contents log corresponding to the retrieved at least one content, when receiving the time stamp from the third device; and a transmission control unit which transmits the contents list to the third device, and provides at least one content, requested by the third device, to the third device.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 3 is a diagram illustrating a configuration of a contents log according to an exemplary embodiment.

Throughout the drawings and the detailed description, the same drawing reference numerals will be understood to refer to the same elements, features, and structures.

DETAILED DESCRIPTION

Figure 1:
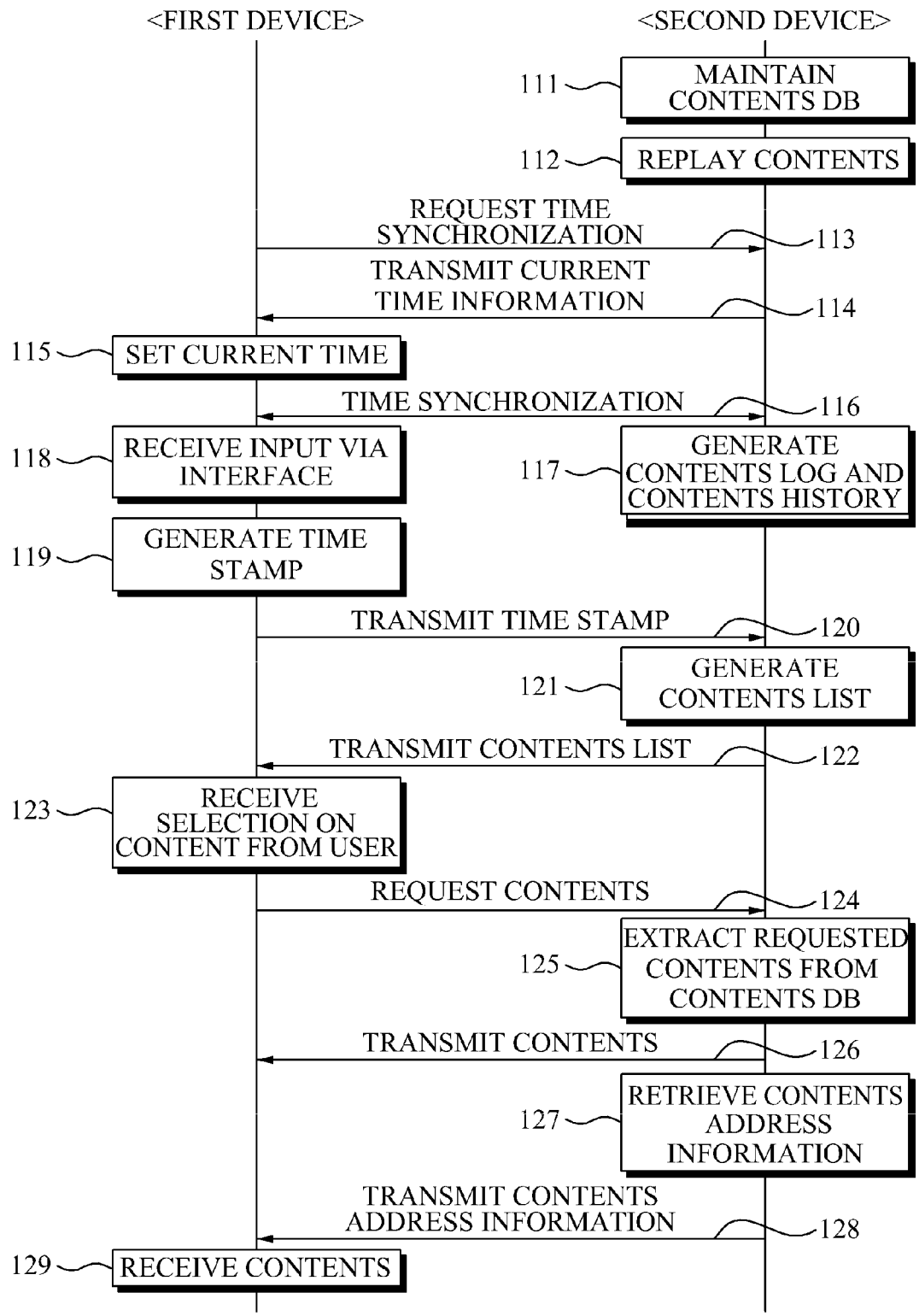
FIG. 1 is a flowchart illustrating a method of sharing contents among devices according to an exemplary embodiment.

The following detailed description is provided to assist the reader in gaining a comprehensive understanding of the methods and systems described herein. Accordingly, various changes, modifications, and equivalents of the systems and methods described herein will be suggested to those of ordinary skill in the art. Also, descriptions of well-known functions and constructions are omitted to increase clarity and conciseness. FIG. 1 illustrates a method of sharing contents among devices according to an exemplary embodiment.

As illustrated in FIG. 1, the method of sharing contents among devices may be performed in a first device and a second device.

In operation 111, the second device maintains a contents database storing at least one content. In operation 112, the second device replays the at least one content. The second device may replay the least one content stored in the contents database, and replay contents provided in an external server by connecting to the external server.

Where contents that a user desires to acquire is included in the at least one content being replayed in the second device, the user of the first device inputs an input via an interface with respect to a time synchronization to the first device. In operation 113, when receiving the input via the interface from the user, the first device requests the second device for the time synchronization.

In operation 114, when receiving the request for the time synchronization from the first device, the second device transmits current time information to the first device. In operation 115, the first device sets a current time of the first device as the current time information received from the second device. In operation 116, the time synchronization between the first device and the second device is performed where the current time of the first device and a current time of the second device are set to be the same.

The time synchronization method described above in operation 113 through operation 116 is an exemplary embodiment, and a variety of time synchronization methods between the devices may be applicable. For example, when the first device requests the second device for time synchronization, the first device and the second device simultaneously count time from 0, and thus the time synchronization may be performed.

In operation 117, the second device generates a contents log and a contents history with respect to the at least one content being replayed after the time synchronization with the first device.

The contents log may include one or more of file name information, directory information, process/program information, permission information, start information, termination information, active duration information, and screen shot information of the at least one content.

The contents history may include one or more of start information and termination information of a process, start information and termination information of each of the at least one content, and screen output information of each of the at least one content.

Exemplary contents log and the contents history are described in detail with reference to FIGS. 2 and 3.

Figure 2:
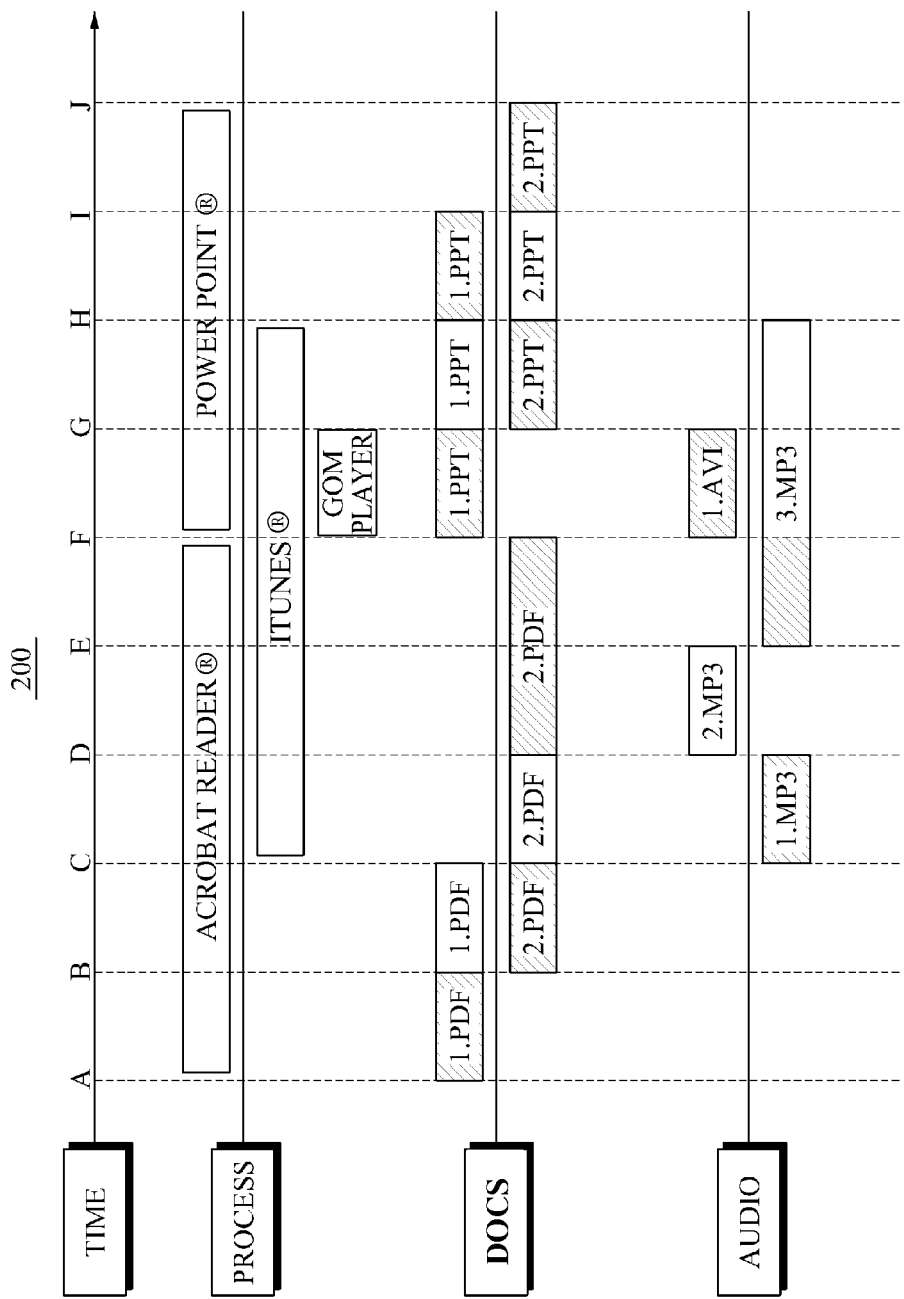
FIG. 2 is a diagram illustrating a configuration of a contents history according to an exemplary embodiment.

FIG. 2 illustrates a configuration of a contents history according to an exemplary embodiment.

In the contents history illustrated in FIG. 2, the second device replays contents "1.pdf" and "2.pdf" via a process of ACROBAT READER®, contents "1.ppt" and "2.ppt" via a process of POWERPOINT®, contents "1.mp3" and "2.mp3" via a process of ITUNES®, and contents "1.avi" via a process of "GOM player".

The second device may replay each of the above-described contents via each of the processes for each time according to an input of a user. For example, the second device may replay the contents "1.pdf" for a period of time from A to C, and the contents "2.pdf" for a period of time from B to F via the process of ACROBAT READER®.

Also, the second device may replay the contents "1.ppt" for a period of time from F to I, and the contents "2.ppt" for a period of time from G to J via the process of POWERPOINT®.

Also, the second device may replay the contents "1.mp3" for a period of time from C to D, the contents "2.mp3" for a period of time from D to E, and contents "3.mp3" for a period of time from E to H via the process of ITUNES®.

Also, the second device may replay the contents "1.avi" for a period of time from F to G via the process of "GOM player".

As described above, the contents history may include performance information about all contents replayed after the time synchronization. Specifically, the contents history may include start information and termination information of each of the processes, and start information and termination information of each of the contents. A time synchronization point in time may be set as A in the contents history.

Also, the contents history may include screen output information of each of the contents. The screen output information refers to information about whether each of the contents is outputted on a display screen of the second device as a main screen.

For example, in the contents history illustrated in FIG. 2, the contents "1.pdf" and "2.pdf" may be simultaneously replayed for a period of time from B to C. In this instance, according to a selection of the user, the contents "2.pdf" may be displayed on the display screen of the second device as the main scene, and the contents "1.pdf" may be displayed in a partial screen or a minimized screen for the period of time from B to C. Accordingly, the screen output information may include information about the contents "2.pdf" outputted as the main scene for the period of time from B to C, as illustrated in a dark color in the contents history. The screen output information of each of the contents may be applied to each of the contents in all periods of time described above.

FIG. 3 illustrates a configuration of a contents log according to an exemplary embodiment.

As described above, the second device may generate a contents history with respect to at least one content being replayed after the time synchronization with the first device, as well as the contents log. FIG. 3 illustrates a portion of the contents log generated corresponding to the contents history illustrated in FIG. 2.

As illustrated in FIG. 3, a contents log corresponding to a contents file name "1.ppt" may include directory information of "C:/My Patents/1.ppt", process/program information of MICROSOFT POWERPOINT®, permission information of "Permission: rw-/---/---(400)", start information and termination information of "Opened at F/Closed at I", and active duration information of "Active Duration: F~G/H~I". Also, the contents log may further include screen shot information corresponding to the contents "1.ppt".

Also, a contents log corresponding to a contents file name "1.avi" may include directory information of "C:/My Movies/1.avi", process/program information of "GOM player", permission information of "Permission: r--/---/---(440)", start information and termination information of "Opened at F/Closed at G", and active duration information of "Active Duration: F~G". Also, the contents log may further include screen shot information corresponding to the contents "1.avi".

Also, a contents log corresponding to a contents file name "3.mp3" may include directory information of "C:/My Music/3.mp3", process/program information of ITUNES®, permission information of "Permission: rwx/r--/r--(644)", start information and termination information of "Opened at E/Closed at H", and active duration information of "Active Duration: E~F". Also, the contents log may further include screen shot information corresponding to the contents "3.mp3", for example, an album image.

Referring again to FIG. 1, in operation 118, the first device receives an input via an interface from the user at a particular point in time. For example, the user of the first device may input via the interface to the first device at a point in time when the second device replays contents, which is to be acquired, from among the at least one content replayed by the second device. The input via the interface may be embodied in various ways such as a keypad input, touch screen input, voice input of the first device, and the like.

In operation 119, when receiving the input via the interface from the user, the first device generates a time stamp including information about a time when the input via the interface is received. For example, referring to the contents history of FIG. 2, when the user performs an input via the interface at a particular time between F and G, hereinafter, a first point in time, the first device generates a time stamp including information about the first point in time.

In operation 120, the first device transmits the time stamp including the information about the first point in time to the second device.

As described above, the time stamp generation in operation 119 and the time stamp transmission in operation 120 may be performed in real time every time the user inputs via the interface. Also, the time stamp generation in operation 119 and the time stamp transmission in operation 120 may be embodied to generate a time stamp including information about all points in time according to at least one input via an interface for a predetermined period of time, and transmit the time stamp when receiving a command with respect to a transmission of the time stamp from the user. However, the time stamp generation in operation 119 and the time stamp transmission in operation 120, embodied in real time every time the user inputs via the interface, have been described as an example for convenience of description in this specification.

When receiving the time stamp from the first device, the second device retrieves at least one content, which is replayed at the first point in time included in the time stamp, from the contents history. For example, referring to the contents history of FIG. 2, when the first point in time is a particular time between F and G, the second device may retrieve contents "1.ppt", "1.avi", and "3.mp3", which is being replayed at the first point in time, from the contents history.

In operation 121, the second device generates a contents list including the contents log with respect to the retrieved contents. The contents list may be embodied to include the contents log illustrated in FIG. 3. Also, the contents list may be embodied to include the contents file name and the contents log, or to include only the contents file name.

In operation 122, the second device transmits the generated contents list to the first device.

The first device displays the contents list to the user. In operation 123, the first device receives a selection on at least one content from among the contents list from the user.

In operation 124, the first device requests the second device for the at least one content selected by the user. The first device generates a contents selection list, and thereby may request the second device for the at least one content. The contents selection list includes at least one content file name and contents log selected by the user from among the contents list.

In operation 125, the second device extracts the at least one content, requested by the first device, from the contents database. In operation 126, the second device transmits the at least one content, extracted from the contents database, to the first device.

In operation 127, when the at least one content, requested by the first device, is replayed by being provided from an external server, the second device retrieves contents address information with respect to the external server. The contents address information includes address information about the at least one content. In operation 128, the second device transmits the retrieved contents address information to the first device.

In operation 129, the first device receives the at least one content and the contents address information. Also, the first device provides the user with the at least one content and the contents address information.

According to the method of sharing contents between the first device and the second device described with reference to FIGS. 1 through 3, when the user of the first device desires to acquire contents being replayed in the second device, the user may acquire the contents from the second device by only requesting a time synchronization with respect to the second device and inputting a time stamp to the first device while the contents is being replayed, even though the user has no information about the contents.

Figure 4:
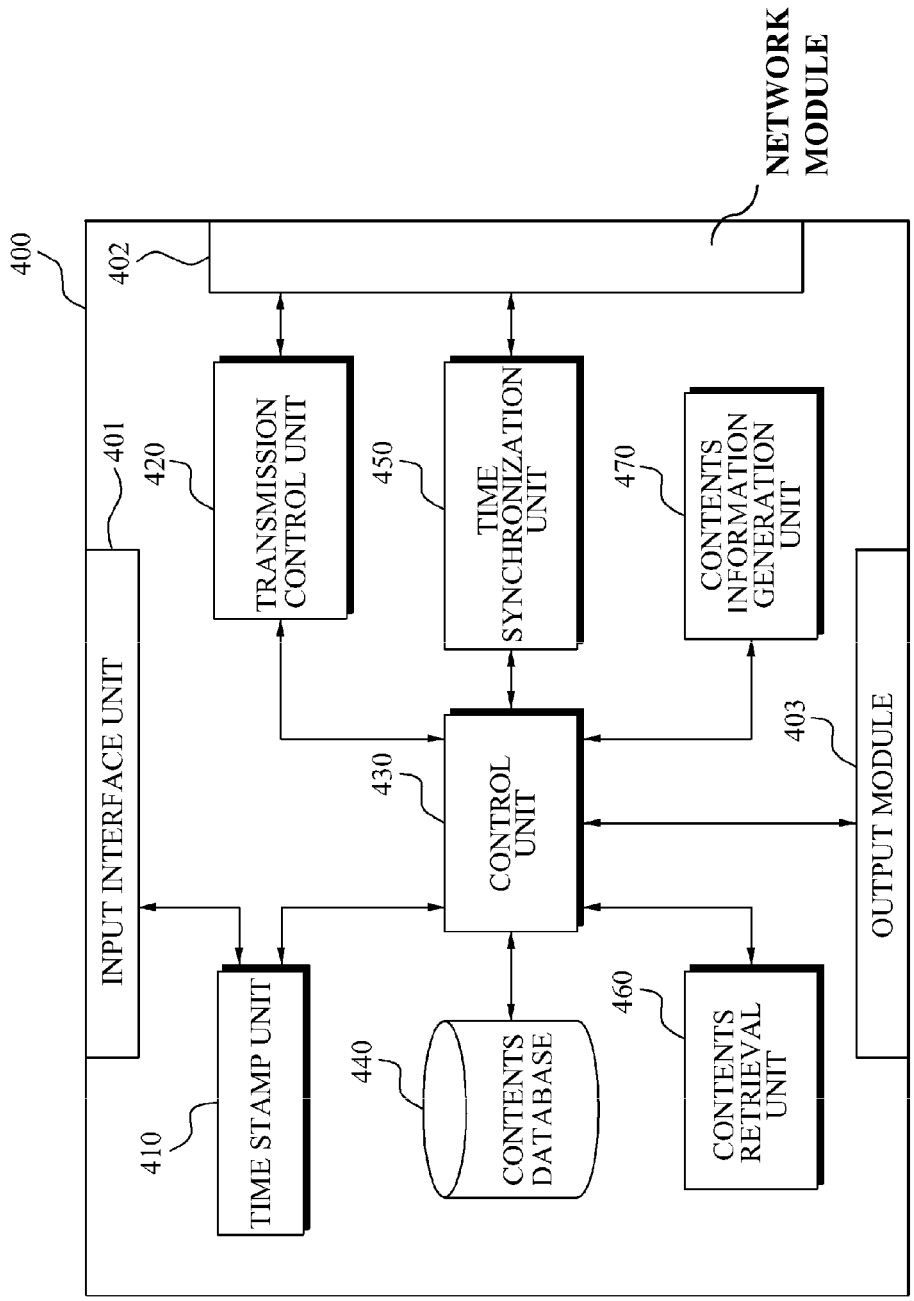
FIG. 4 is a block diagram illustrating a configuration of a device according to an exemplary embodiment.
Figure 5:
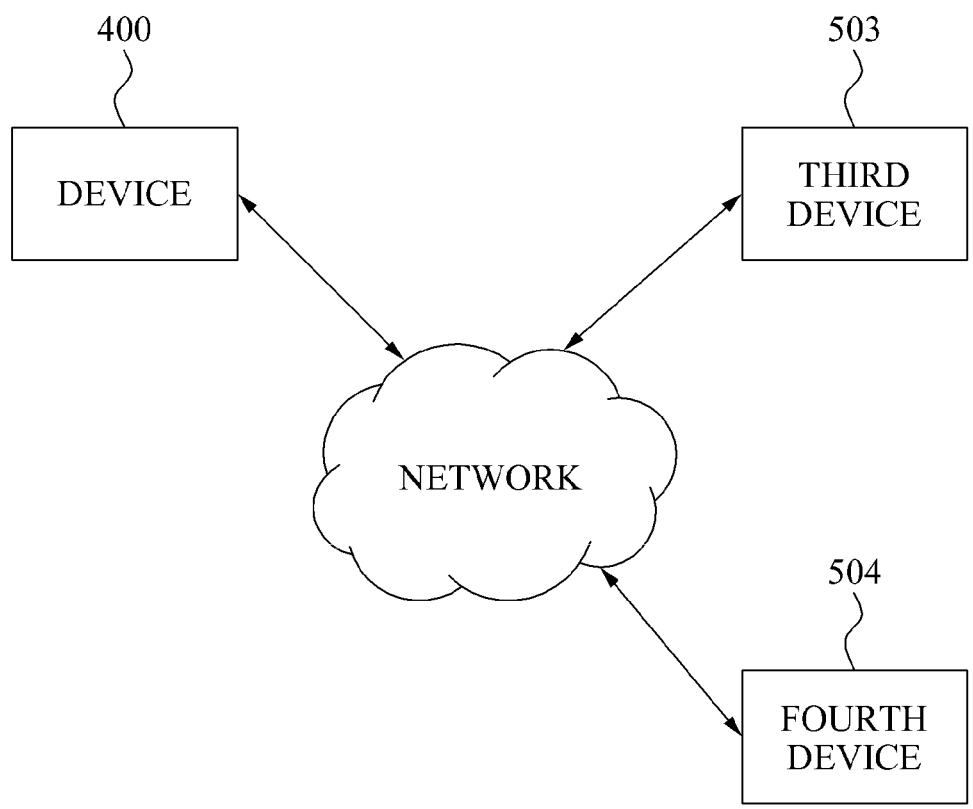
FIG. 5 is a diagram illustrating an example of a plurality of devices communicating through a network.

FIG. 4 illustrates a configuration of a device 400 according to an exemplary embodiment.

The device 400 includes a time stamp unit 410, a transmission control unit 420, a control unit 430, a contents database 440, a time synchronization unit 450, a contents retrieval unit 460, a contents information generation unit 470, an input interface unit 401, a network module 402, and an output module 403.

The device 400 illustrated in FIG. 4 includes a configuration of a device providing contents and a configuration of a device acquiring contents. Specifically, the device 400 illustrates a configuration of the first device, which acquires contents, and a configuration of the second device, which provides contents, in FIG. 1.

Accordingly, when the device 400 is embodied as the first device, the device 400 may necessarily include the time stamp unit 410, the time synchronization unit 450, the input interface unit 401, and the network module 402.

Also, when the device 400 is embodied as the second device, the device 400 may necessarily include the transmission control unit 420, the contents database 440, the time synchronization unit 450, the contents retrieval unit 460, the contents information generation unit 470, and the network module 402.

However, the device 400 including the configuration of the first device and the configuration of the second device has been described as an example for convenience of description in this specification.

The contents database 440 maintains at least one content.

The control unit 430 replays the at least one content stored in the contents database 440. The control unit 430 may replay the at least one content via the output module 403.

The time synchronization unit 450 performs a time synchronization with at least one other device different from the device 400. Specifically, when the time synchronization is requested by a third device 503 via the network module 402, the time synchronization unit 450 transmits current time information to the third device 503 via the network module 402. The third device 503 sets a current time as the current time information received from the time synchronization unit 450.

Also, when a user inputs a command with respect to a time synchronization with a fourth device 504 via the input interface unit 401, the time synchronization unit 450 requests the fourth device 504 for the time synchronization via the network module 402, and sets a current time of the device 400 according to current time information received from the fourth device 504.

When performing the time synchronization with the third device 503, the contents information generation unit 470 generates a contents log and a contents history with respect to at least one content being replayed after the time synchronization.

The contents log may include one or more of file name information, directory information, process/program information, permission information, start information, termination information, active duration information, and screen shot information of the at least one content. The contents history may include one or more of start information and termination information of a process, start information and termination information of each of the at least one content, and screen output information of each of the at least one content. The contents log and the contents history may be embodied to be the same as a contents log and contents history described with reference to FIGS. 1 through 3.

When receiving a time stamp from the third device 503 via the network module 402, the contents retrieval unit 460 retrieves at least one content corresponding to the time stamp by referring to the contents history, and generates a contents list including a contents log corresponding to the retrieved at least one content.

The transmission control unit 420 transmits the contents list to the third device 503 via the network module 402.

When receiving a contents selection list, selected from the contents list by a user of the third device 503, from the third device 503 via the network module 402, the transmission control unit 420 extracts at least one content corresponding to the contents selection list from the contents database 440, and transmits the extracted at least one content to the third device 503 via the network module 402.

Also, when the at least one content corresponding to the contents selection list is received from an external server, the transmission control unit 420 retrieves contents address information about the external server, and transmits the retrieved contents address information to the third device 503.

When the time synchronization unit 450 requests the fourth device 504 for a time synchronization according to a user's input and the time synchronization with the fourth device 504 is performed, the input interface unit 401 receives an input via an interface with respect to contents, being replayed by the fourth device 504 after the time synchronization, from the user at a first point in time.

In this instance, the time stamp unit 410 generates a time stamp including information about the first point in time. The transmission control unit 420 transmits the time stamp to the fourth device 504 via the network module 402.

Also, when receiving the input via the interface from the user at least once within a predetermined time, the time stamp unit 410 generates at least one time stamp including time information about each time when the input via the interface is received, and when receiving the time stamp from the user, the transmission control unit 420 may transmit the at least one time stamp to the fourth device 504.

Although a method of sharing contents among devices and device have been simply described with reference to FIG. 4, it is apparent to those skilled in the related art that the method of sharing contents among devices and device described with reference to FIG. 4 may be embodied to include the configuration of the device 400 and the method of sharing contents among devices described with reference to FIGS. 1 through 3.

The above-described methods including a method of sharing contents among devices may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The above-described methods may also be included in transmission media such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

According to certain embodiments described above, there is provided a device and method of sharing contents among devices in which, when a user of a first device desires to acquire contents being replayed by a second device, the first device and the second device may perform a time synchronization. When the first devices receives a time stamp from the user, the second device may transmit a contents list corresponding to the time stamp to the first device, and enable the user to select contents. Accordingly, the user may acquire the desirable contents from the second device by only inputting the time stamp to the first device.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of sharing contents among devices, the method comprising:
   a first device and a second device performing a time synchronization;
   the first device receiving, from a user, an input with respect to contents being replayed by the second device at a first point in time;
   the first device generating a time stamp indicating the first point in time;
   the first device transmitting the time stamp to the second device;
   in response to receiving the time stamp, the second device transmitting a contents list, corresponding to the contents replayed by the second device at the time indicated by the time stamp, to the first device;
   the first device requesting, from the second device, contents selected by the user from the contents list received by the first device; and
   the second device providing the requested contents to the first device and generating a contents log and a contents history with respect to at least one content being replayed after the time synchronization with the first device.

2. The method of claim 1, further comprising:
   the first device requesting the time synchronization with the second device;
   the second device transmitting current time information to the first device; and
   the first device setting a current time based on the current time information received from the second device.

3. The method of claim 1, wherein:
   the receiving of the input comprises the first device receiving at least one input from the user during a predetermined time, and
   the transmitting of the time stamp comprises the first device transmitting at least one time stamp, in response to the input received during the predetermined time, to the second device.

4. The method of claim 1, wherein the transmitting of the contents list comprises:

the second device identifying at least one content corresponding to the time stamp by referring to the contents history;

the second device generating the contents list including at least one contents log corresponding to the identified at least one content; and the second device transmitting the contents list to the first device.

5. The method of claim 1, wherein the contents history is displayed as a time graph and includes at least one of start information and termination information of a process, start information and termination information of each of the at least one content, or screen output information of each of the at least one content.

6. The method of claim 1, further comprising:
the second device maintaining a contents database storing at least one content; and
the second device extracting the requested contents from the contents database, and transmitting the extracted contents to the first device.

7. The method of claim 1, further comprising:
the second device transmitting contents address information corresponding to the requested contents to the first device.

8. A non transitory computer-readable recording medium storing a program for implementing a method of sharing contents among devices, the method comprising:
a first device and a second device performing a time synchronization;
the first device receiving, from a user, an input via an interface with respect to contents being replayed by the second device at a first point in time;
the first device generating the time stamp including information about the first point in time;
the first device transmitting a time stamp to the second device;
in response to the time stamp, the second device transmitting a contents list, corresponding to the contents being replayed by the second device at the time of the time stamp, to the first device;
the first device requesting the second device for contents selected by the user from among the contents list; and
the second device providing the requested contents to the first device and generating a contents log and a contents history with respect to at least one content being replayed after the time synchronization with the first device.

9. A terminal, comprising:
a time synchronization unit which performs a time synchronization with first and second devices;
a contents information generation unit, of the second device, which generates a contents log and a contents history with respect to at least one content being replayed by the terminal, after performing the time synchronization with the first device;
a contents retrieval unit which retrieves at least one content corresponding to a first time stamp by referring to the contents history, and generates a contents list including a contents log corresponding to the retrieved at least one content, when receiving the first time stamp from the first device;
a transmission control unit which transmits the contents list to the first device, and provides at least one content, requested by the first device, to the first device; and
a time stamp unit which generates a second time stamp indicating a first point in time, when receiving, from a user, an input at the first point in time with respect to contents being replayed by the second device, wherein
the transmission control unit transmits the second time stamp to the second device.

10. The terminal of claim 9, wherein, when time synchronization is requested by the first device, the time synchronization unit transmits current time information to the first device.

11. The terminal of claim 9, wherein the contents history is displayed as a time graph and includes at least one of start information and termination information of a process, start information and termination information of each of the at least one content, and screen output information of each of the at least one content.

12. The terminal of claim 9, further comprising:
a contents database storing at least one content,
wherein the transmission control unit extracts the at least one content, requested by the first device, from the contents database, and transmits the extracted at least one content to the first device.

13. The terminal of claim 9, wherein the transmission control unit transmits contents address information corresponding to each of the at least one content, requested by the first device, to the first device.

14. The terminal of claim 9, wherein the time stamp unit generates at least one time stamp including time information about each time when the input is received, within a predetermined time from receiving the input, and the transmission control unit transmits the at least one time stamp to the second device.

15. The terminal of claim 9, wherein the transmission control unit receives a selection on the at least one content from the user and requests the selected at least one content from the second device, after receiving the contents list from the second device.

* * * * *